P. J. MAYER.
CORN PLANTER ATTACHMENT.
APPLICATION FILED MAR. 22, 1913.
1,064,922.
Patented June 17, 1913.
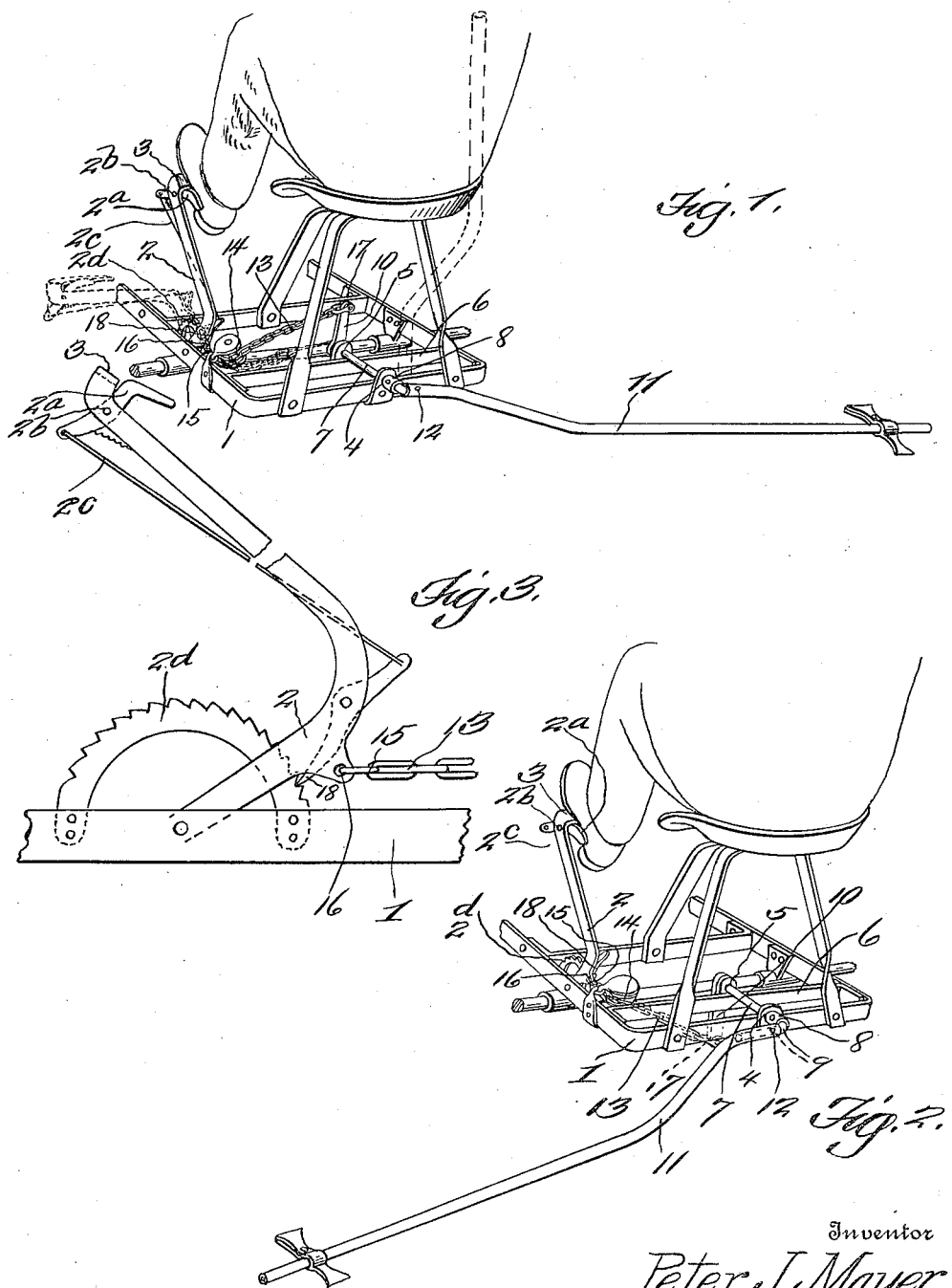
Witnesses
Mark DeGrange.
Francis T. Crowell.
Inventor
Peter J. Mayer,
By D. Swift & Co.,
his Attorneys

UNITED STATES PATENT OFFICE.

PETER J. MAYER, OF MONTROSE, MISSOURI.

CORN-PLANTER ATTACHMENT.

1,064,922.  Specification of Letters Patent. Patented June 17, 1913.

Application filed March 22, 1913. Serial No. 756,163.

*To all whom it may concern:*

Be it known that I, PETER J. MAYER, a citizen of the United States, residing at Montrose, in the county of Henry and State of Missouri, have invented a new and useful Corn-Planter Attachment; and I do hereby declare the following to be a full, clear, and exact description of the invention, such as will enable others skilled in the art to which it appertains to make and use the same.

This invention relates to the art of corn planters, and particularly to a new and useful attachment therefor, whereby the marker bar may be raised and lowered manually, or thrown from the left side of the planter to the right side thereof.

In practical fields, the details of construction of the attachment may necessitate alterations, to which the patentee has a right, provided the alterations fall within the scope of what is claimed.

The invention comprises further features and combination of parts, as hereinafter set forth, shown in the drawings and claimed.

In the drawings:—Figure 1 is a view of a portion of a corn planter showing the improved raising and lowering attachment for the marker bar as applied thereto. Fig. 2 is a view showing the marker bar disposed in a position opposite to that shown in Fig. 1. Fig. 3 is a view in detail of the means for holding the lever 2 down.

Referring more particularly to the drawings, 1 designates a portion of the frame of the corn planter, to which a lever 2 having a foot piece 3, is pivotally connected.

Mounted in bearings 4 and 5 of the frame 1 and the bar 6 of said frame is a rock shaft 7, there being a sleeve 8 to prevent longitudinal movement of the shaft 7. The ends of the shaft 7 are provided with laterally extending arms 9 and 10, which extend at right angles to each other. To the arm 9 the marker bar or tube 11 is sleeved, secured thereto by the pin 12. A chain 13 passing over a pulley 14 has one end 15 connected to the lever 2 at 16, while the other end of said chain is connected at 17 to the arm 10. It will be seen that by depressing the lever with one's foot, the marker bar may be raised to a substantially vertical position, and held in such position, by engaging the lever with the catch 18. Also by depressing the lever with sufficient force and quickness, the marker bar may be thrown from the left side of the corn planter to the right side, and vice versa, owing to the construction and arrangement of the shaft 7 and the arms 9 and 10.

From the foregoing it will be noted that there has been devised a novel, simple and efficient attachment for raising and lowering or adjusting the marker bar, and one which has been found desirable and practical.

The invention having been set forth, what is claimed as new and useful is:—

In combination with a corn planter frame, a rock shaft journaled in bearings of said frame, said rock shaft having arms at its ends extending at right angles to one another, a marker bar secured to one of the arms, a pulley connected to said frame, a lever adapted to be manually actuated pivoted to said frame, a chain passing over said pulley with one end connected to said lever, while its other end is connected to the other arm of said rock shaft, and a catch device to be engaged by said lever, said lever together with the rock shaft and its right angle extending arms constituting means for disposing the marker bar either upon the left or right side of the corn planter.

In testimony whereof I have signed my name to this specification in the presence of two subscribing witnesses.

PETER J. MAYER.

Witnesses:
 EDWARD S. VOGEL,
 ALBERT N. BROUNSBERGER.

---

Copies of this patent may be obtained for five cents each, by addressing the "Commissioner of Patents, Washington, D. C."